Sept. 8, 1970 G. D. CLAPP ET AL 3,527,887

VIDEO SYNCHRONIZING PULSE DETECTION MEANS

Filed April 11, 1968 3 Sheets-Sheet 1

*INVENTORS.*
GARY D. CLAPP,
LANCE E. RIGGIN and
DONALD R. WILLIS

H. H. Losche
Attorney

AMPLITUDE LIMITER

LEADING EDGE DETECTOR

*INVENTORS.*
GARY D. CLAPP,
LANCE E. RIGGIN and
DONALD R. WILLIS
H. H. Losche
Attorney

VIDEO SYNCHRONIZING PULSE DETECTION MEANS

Filed April 11, 1968 3 Sheets-Sheet 3

TRAILING EDGE DETECTOR

DUAL MODE HALF SHOT

OUTPUT GATE

*INVENTORS.*
GARY D. CLAPP,
LANCE E. RIGGIN and
DONALD R. WILLIS

H. H. Losche
Attorney

United States Patent Office 3,527,887
Patented Sept. 8, 1970

3,527,887
VIDEO SYNCHRONIZING PULSE DETECTION MEANS

Gary D. Clapp and Lance E. Riggin, Indianapolis, and Donald R. Willis, Fort Wayne, Ind., assignors to the United States of America as represented by the Secretary of the Navy
Filed Apr. 11, 1968, Ser. No. 720,732
Int. Cl. H04n 5/44
U.S. Cl. 178—7.3 2 Claims

ABSTRACT OF THE DISCLOSURE

A video synchronizing pulse detection circuit for detecting horizontal and vertical synchronizing pulses present in a composite television video signal received from a high signal noise level environment such as that inherent in transmissions from high performance aircraft, missiles, and satellites, and producing an output signal comprised of reconstructed, noise free, horizontal and vertical synchronizing pulses for use by subsequent video synchronizing pulse separation circuitry. The detection circuit includes an amplitude limiting input stage for accepting the received and amplified, noisy composite television video signal from a video display preamplifier, and clipping that signal at a predetermined negative-going level. The clipped output signal of the amplitude limiter is coupled to a leading edge detector which senses the leading edges, and clamps the tips of the horizontal and vertical synchronizing pulses to ground. This ground referenced signal is then coupled to an output gate circuit which initiates the beginning of a reconstructed horizontal or vertical sync detector output pulse in response thereto. The ground referenced signal from the leading edge detector is also coupled to a trailing edge detector which senses the trailing edge of the horizontal or vertical output pulse from the leading edge detector, and produces a trigger signal to a dual mode "half shot" circuit in response to each trailing edge detected. The half shot circuit delays each horizontal or vertical pulse trailing edge signal by a respective predetermined amount of time for purposes of protection from noise, and then supplies an "end of sync pulse" signal to the output gate circuit to terminate the reconstructed, noise free, horizontal or vertical sync output pulse.

BACKGROUND OF THE INVENTION

This invention is in the field of electrical pulse detection systems, and more specifically in the area of video synchronizing pulse detection circuitry for detecting and reconstructing noise free horizontal and vertical synchronizing pulses from a noisy composite television video signa.l The utilization of television video systems for remote observation and guidance in both military and space vehicles is presently increasing. Such vehicles, of necessity, often must operate in relatively high signal noise level environments. The airborne or ground video receiving and display systems, must receive the noise-ridden composite television video signals from these vehicles and provide a usable video display suitable for vehicle control including guidance, and/or for observation of the area surrounding the vehicle. It is necessary for these video receiving and display systems to produce reliable, noise-free horizontal and vertical video synchronizing pulses from the noisy composite video signals received from the vehicle in order to provide a usable video display. Thus a need has arisen for a video synchronizing pulse detection means capable of reconstructing reliable, noise-free synchronizing pulses from a noisy composite video signal. The present invention fulfills this need. Known video pulse detection devices of the prior art are primarily found in commercial home television receiving sets and have proven unsuitable for use with military and space vehicle video systems in which the composite video signals are subjected to much higher noise levels.

SUMMARY OF THE INVENTION

The present invention provides a video synchronizing pulse detection circuit for detecting and reconstructing noise free horizontal and vertical synchronizing pulses from a noise-ridden composite television video signal. The invention would normally be utilized in an airborne or ground video receiving and display means following a video display preamplifier, from which it would receive the amplified noisy composite video signal as an input and provide a train of reconstructed, noise free, combined horizontal and vertical synchronizing pulses as an output to following synchronizing pulse separation circuitry.

The invention is comprised of an amplitude limiting input stage, leading and trailing edge detector stages, a dual mode "half shot" circuit, and an output gate circuit. The amplitude limiting input stage receives the noisy composite video signal from the display system preamplifier and clips that signal at a predetermined negative going level. This clipped signal from the amplitude limiter is coupled to the leading edge detector stage which senses the leading edges of the horizontal and vertical synchronizing pulses in the composite video signal, and clamps the tips of these pulses to ground potential. This ground referenced signal is then coupled from the leading edge detector to an input gate circuit where each detected leading edge of a synchronizing pulse initiates the leading edge of a corresponding reconstructed, noise free, synchronizing output pulse. The ground referenced signal from the leading edge detector stage is also coupled to a trailing edge detector stage which senses the respective trailing edge of each synchronizing pulse and produces a trailing edge trigger signal in response thereto. This trailing edge signal is coupled to a dual mode "half shot" circuit which, after a predetermined delay period initiated by the trigger signal, provides an "end of sync pulse" signal to the output gate circuit which then terminates, and provides the trailing edge of, the reconstructed, noise free synchronizing pulse. The reconstructed horizontal and vertical synchronizing pulse train is then available for use by subsequent circuitry, such as a video synchronizing pulse separation means.

BRIEF DESCRIPTION OF THE DRAWINGS

The objects and the attendant advantages, features, and uses of the invention will become apparent from the following detailed description of the invention when considered in conjunction with the accompanying drawings in which like reference numerals designate like parts throughout the figures thereof, and wherein.

DESCRIPTION OF THE PREFERRED EMBODIMENT

Figure 1:
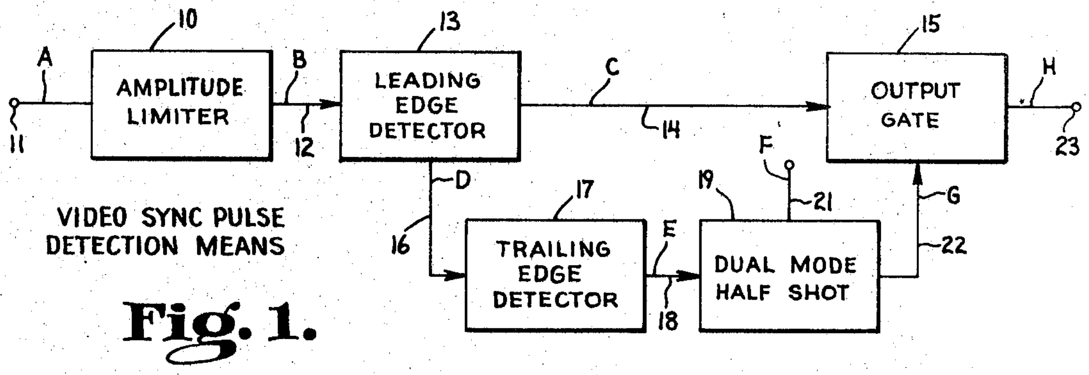
FIG. 1 depicts a block diagram of the video synchronizing pulse detection means comprising this invention.

Referring more particularly to the embodiment of the invention shown in FIG. 1 in block diagram form, an amplitude limiting input stage 10 has an input means 11 for receiving the noisy composite television video signal from preceding circuitry, and an output means 12 for coupling the output signal from limiter 10 to a leading edge detector stage 13. Leading edge detector 13 has a first output means 14 for coupling its output signal to an output gate circuit 15, and a second output means 16 for coupling its ground referenced signal to a trailing edge detector stage 17. Trailing edge detector 17 has an output means 18 for coupling its output trigger signal to a dual mode half shot circuit 19, which also has an input means 21 for receiving a mode control signal from circuitry not shown, such as a video synchronizing pulse separation circuit. Half shot circuit 21 has an output means 22 for coupling the appropriately delayed trailing edge terminating signal to output gate 15 which, in turn, provides the noise-free, reconstructed, horizontal and vertical synchronizing pulses to an output means for utilization by subsequent circuitry. The letters A through H indicate the points of reference for the various representative waveforms shown in FIG. 2.

Figure 2:
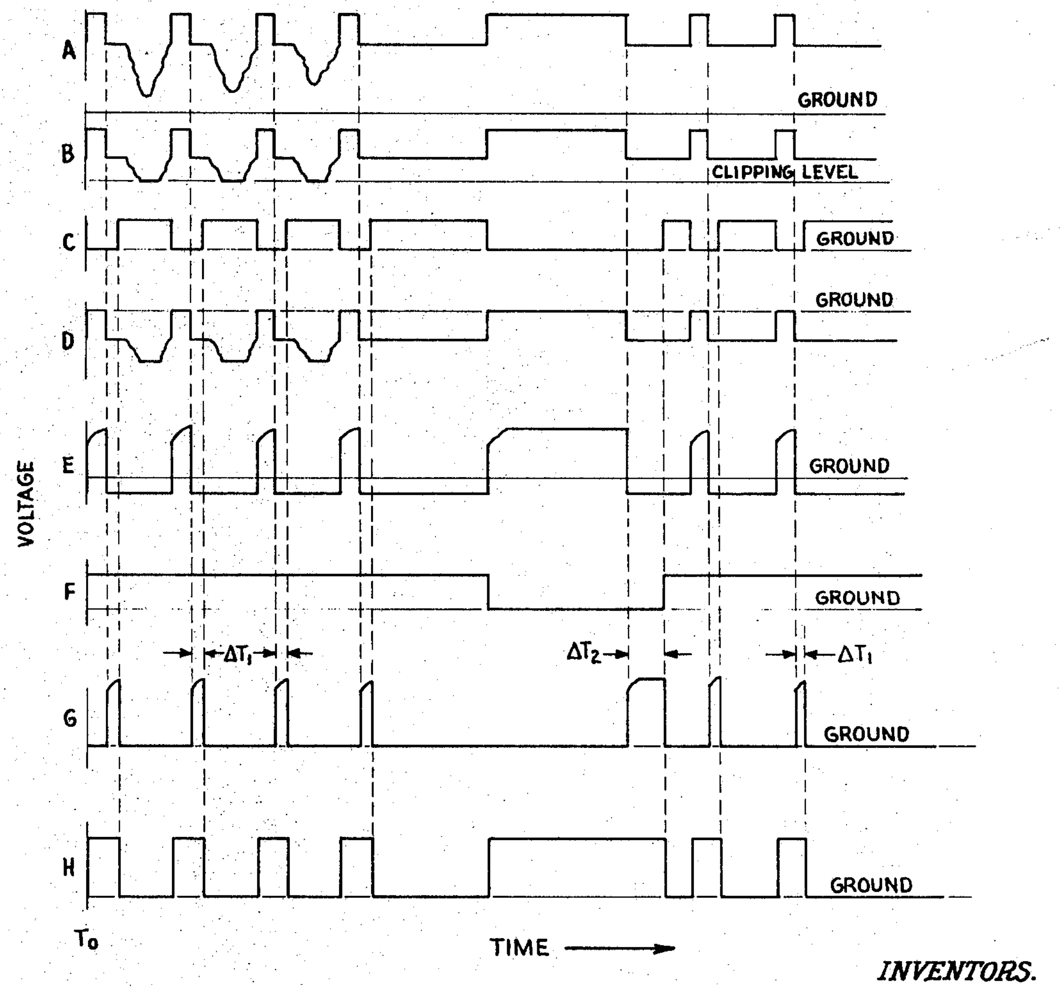
FIG. 2 represents waveforms of a typical signal at various reference points throughout the embodiment of the invention shown in FIG. 1, to aid in the understanding thereof.

The waveforms A through H of FIG. 2 are representative of a typical signal at the various reference points throughout the embodiment of the invention as shown in FIG. 1. Waveform A represents the potentially noisy composite television video signal, including positive-going horizontal (narrow) and vertical (wide) synchronizing pulses, as it might appear when applied to input means 11 of the invention. Waveform H represents the noise-free, reconstructed horizontal and vertical pulse synchronizing signal as it would appear at output means 23 of the invention. Waveform B through G represent the various waveforms of the signal at the indicated points throughout the invention. These waveforms will become better understood as the description of the operation proceeds.

Figure 3:
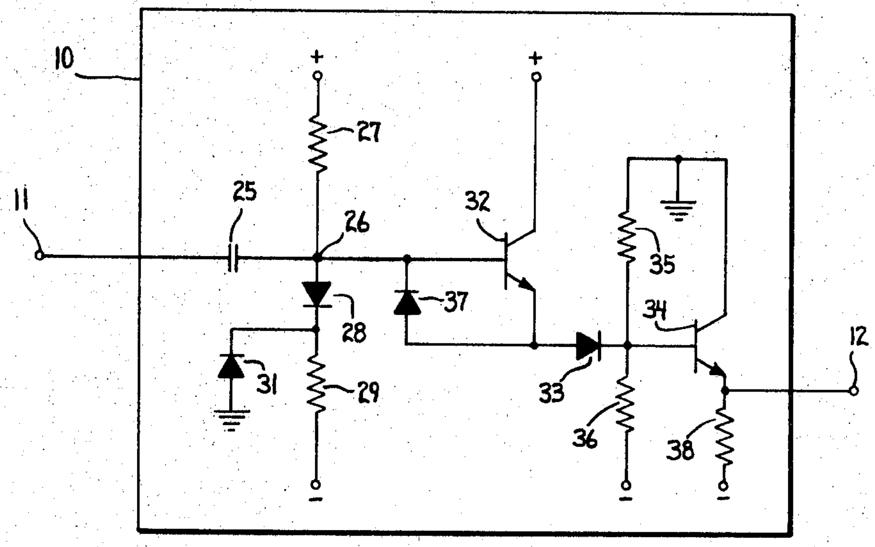
FIGS. 3 through 7 are schematic diagrams of circuitry suitable for use in each of the blocks of the embodiment of the invention shown in FIG. 1.

With reference to FIG. 3, there is shown a schematic embodiment of a circuit suitable for use as amplitude limiter 10, in which input means 11 is coupled to one terminal of a capacitance 25, the other terminal of which is coupled to a junction point 26. Junction 26 is coupled via a resistance 27 to a source of positive direct current (D.C.) potential, and via a diode 28 and a resistance 29 to a source of negative D.C. potential. The junction of diode 28 and resistance 29 is coupled via diode 31 to ground potential. Junction 26 is further coupled to the base electrode of a transistor 32 which has its collector electrode coupled to a positive D.C. source and its emitter electrode coupled via a diode 33 to the base electrode of a transistor 34 which is also coupled via a resistance 35 to ground potential and via a resistance 36 to a negative D.C. source. A protection diode 37 is coupled between the base and emitter electrodes of transistor 32. The collector electrode of transistor 34 is coupled to ground potential, while its emitter electrode is coupled to output means 12 and via a resistance 38 to a negative D.C. source.

Figure 4:
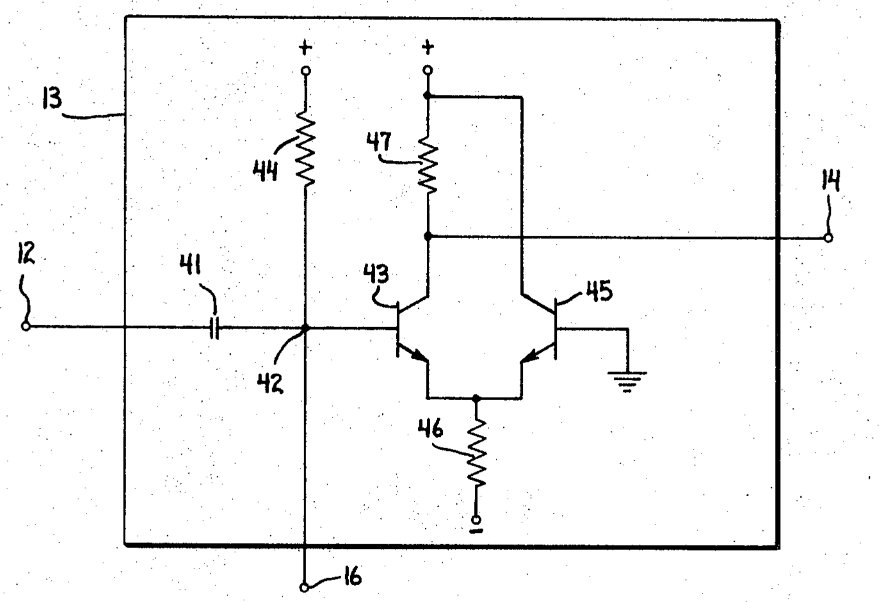

In FIG. 4 there is shown a schematic embodiment of a circuit which might be utilized as the leading edge detector 13 of FIG. 1. The output means 12 of limiter 10 is coupled to one terminal of a clamping capacitance 41 which has its other terminal coupled via a junction point 42 to the base electrode of a transistor 43. A resistance 44 is coupled between junction 42 and a source of positive D.C. potential. Output means 16, for coupling to trailing edge detector 17, is coupled to junction 42. Transistor 43 has its emitter and collector electrodes coupled in a differential pair configuration with a transistor 45, the emitter electrode of each being coupled in common through a resistance 46 to a negative D.C. source while the collector electrode of transistor 43 is coupled, via a resistance 47, in common with the collector electrode of transistor 45 to a positive D.C. source. The base electrode of transistor 45 is coupled to ground potential, while output means 14 is coupled to the collector electrode of transistor 43.

Figure 5:
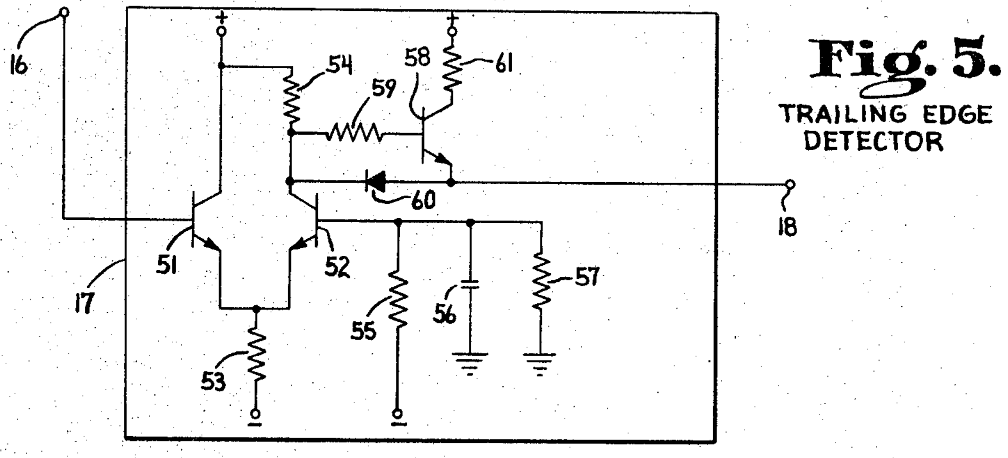

Referring now to FIG. 5, there is shown a schematic embodiment of a circuit suitable for use as trailing edge detector 17 of FIG. 1. Output means 16 from leading edge detector 13 is coupled to the base electrode of a transistor 51 which has its emitter and collector electrodes coupled in a differential pair configuration with a transistor 52, the emitter electrode of each being coupled in common, via a resistance 53, to a negative D.C. source. The collector electrode of transistor 52 is coupled, via a resistance 54, in common with the collector electrode of transistor 51 to a positive D.C. source, while its base electrode is coupled via a resistance 55 to a negative D.C. source and via the parallel combination of a capacitance 56 and a resistance 57 to ground potential. A driving transistor 58 has its base electrode coupled via a resistance 59 to the collector electrode of transistor 52, and its emitter electrode coupled, via a diode 60 to the collector electrode of transistor 52, and also to output means 18. A resistance 61 couples the collector electrode of transistor 58 to a positive D.C. source.

Figure 6:
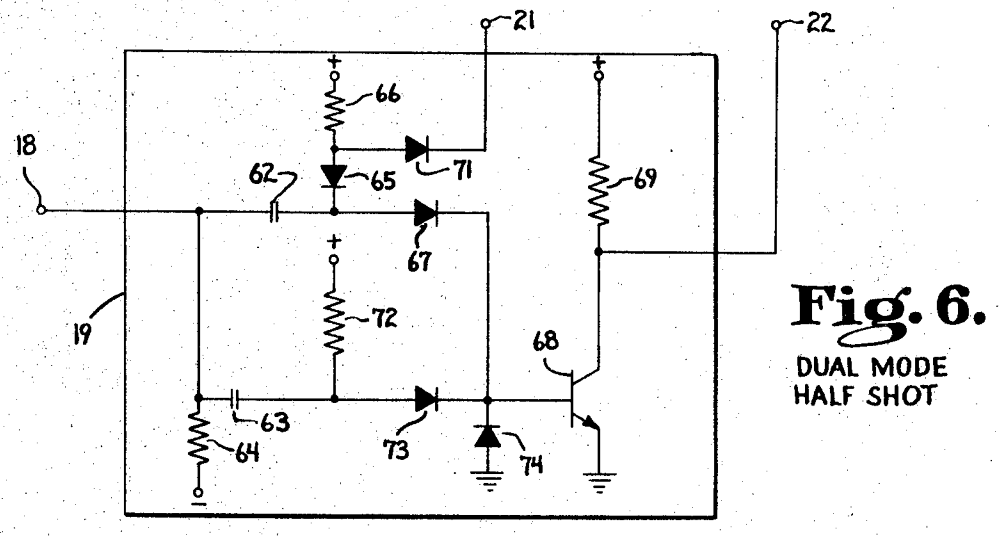

With reference to FIG. 6, there is depicted a schematic embodiment of a circuit suitable for use as dual mode half shot circuit 19 of FIG. 1. Output means 18 of trailing edge detector 17 is coupled to one terminal of each of the capacitances 62 and 63 and via a resistance 64 to a negative D.C. source. The other terminal of capacitance 62 is coupled via a diode 65 and a resistance 66 to a positive D.C. source, and via a diode 67 to the base electrode of a transistor 68, which has its emitter electrode coupled to ground and its collector electrode coupled via a resistance 69 to a positive D.C. source, and to output means 22. Input means 21, for receiving a mode control or feedback signal from circuitry such as a synchronizing pulse separation circuit, is coupled via a diode 71, to the junction of diode 65 and resistance 66. The other terminal of capacitance 63 is coupled via a resistance 72 to a positive D.C. source, and via a diode 73 to the base electrode of transistor 68, which is further coupled to the cathode electrode of a diode 74 which has its anode electrode coupled to ground.

Figure 7:
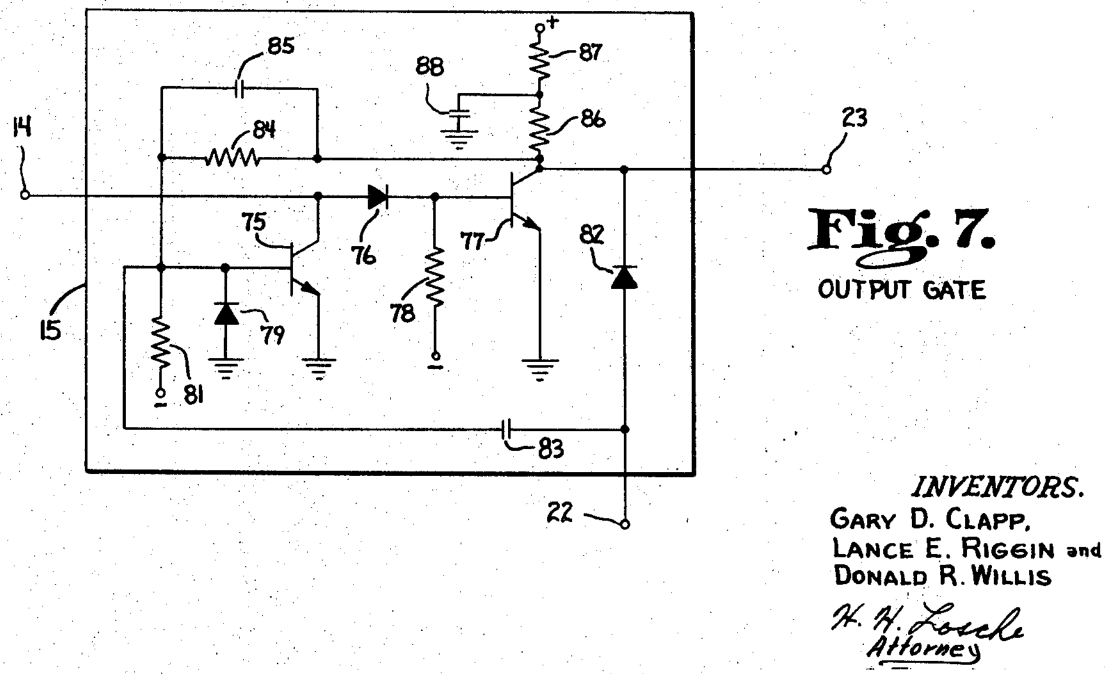

In FIG. 7 there is shown a schematic embodiment of a circuit suitable for utilization as output gate 15 of FIG. 1. Output means 14 from leading edge detector 13 is coupled to the collector of a transistor 75 and via a diode 76 to the base electrode of a transistor 77 which is also coupled via a resistance 78 to a negative D.C. source. The emitter electrode of transistor 75 is coupled to ground, and its base electrode is coupled via a diode 79 to ground and via a resistance 81 to a negative D.C. source. Output means 22, from dual mode half shot circuit 19, is coupled via a diode 82 to the collector electrode of transistor 77, and via a capacitance 83 to the base electrode of transistor 75. The parallel combination of a resistance 84 and a capacitance 85 is coupled between the collector electrode of transistor 77 and the base electrode of transistor 75. The collector electrode of transistor 77 is further coupled via resistances 86 and 87 to a positive D.C. source, while the junction of resistances 86 and 87 is coupled via a capacitance 88 to ground. The output means 23 of the invention is coupled to the collector electrode of transistor 77.

For convenience in specifically describing one operative example of the invention, the following table lists the various elements and components shown in the figures of drawing, with suitable values and types therefor. While this example of a working embodiment is provided herein, it is to be understood that these elements, components, and values are in no way to limit the invention thereto, as other values and other components of a like nature may be utilized to accomplish similar results.

TABLE

| | | |
|---|---|---|
| **Amplitude limiter 10** | | |
| Transistors **32** and **34** | | 2N2369 |
| Diodes **28**, **31**, **33** and **37** | | FD100 |
| Capacitance **25** | mfd | 1 |
| Resistances: | | |
| **27** | ohms | 200,000 |
| **29** | do | 4,700 |
| **35** | do | 1,800 |
| **36** | do | 3,300 |
| **38** | do | 1,000 |
| **Leading edge detector 13** | | |
| Transistors **43** and **45** | | 2N2918 |
| Capacitance **41** | mfd | 1 |
| Resistances: | | |
| **44** | ohms | 47,000 |
| **46** | do | 1,330 |
| **47** | do | 15,000 |
| **Trailing edge detector 17** | | |
| Transistors: | | |
| **51** and **52** | | 2N2918 |
| **58** | | 2N2369 |
| Diode **60** | | FD100 |
| Capacitance **56** | picofarads | 100 |
| Resistances: | | |
| **53** | ohms | 2,200 |
| **54** | do | 15,000 |
| **55** | do | 1,000 |
| **57** | do | 140 |
| **59** | do | 30 |
| **61** | do | 620 |
| **Dual mode half shot circuit 19** | | |
| Transistor **68** | | 2N2369 |
| Diodes **65**, **67**, **71**, **73** and **74** | | FD100 |
| Capacitances: | | |
| **62** | mfd | 47 |
| **63** | picofarads | 300 |
| Resistances: | | |
| **64** | ohms | 11,000 |
| **66** | do | 30,000 |
| **69** | do | 8,200 |
| **72** | do | 47,000 |
| **Output gate circuit 15** | | |
| Transistors **75** and **77** | | 2N2369 |
| Diodes **76**, **79** and **82** | | FD100 |
| Capacitances: | | |
| **83** | picofarads | 100 |
| **85** | do | 220 |
| **88** | do | 1,500 |
| Resistances: | | |
| **78** | ohms | 47,000 |
| **81** | do | 39,000 |
| **84** | do | 3,900 |
| **86** | do | 910 |
| **87** | do | 180 |
| All positive D.C. potential sources | volts | +12 |
| All negative D.C. potential sources | do | −12 |

OPERATION

The operation of the video synchronizing pulse detection means comprising the invention will be explained with regard to the signal as it is received at input terminal means 11 (see FIG. 1), progresses through the various blocks of the invention, and produces an appropriate reconstructed output signal at output terminal means 23, for use by subsequent sync separator circuitry.

The noisy composite television video input signal is received at input means 11 (waveform A of FIG. 2) of amplitude limiter 10 (FIG. 3) which limits the input signal into leading edge detector 13 and trailing edge detector 17 to a predetermined maximum amplitude, measured from the tip of the sync pulse. This is accomplished by clamping the tip of the sync pulse to ground and driving a clipping stage with the ground referenced signal. The clipping stage clips all portions of the input signal going more negative than the predetermined amplitude from the ground reference. The limiting prevents possible overdrive of the leading and trailing edge detectors, and thus prevents failure of the entire sync detector means, which might otherwise be caused by the input signal exceeding the emitter base breakdown voltage of the transistors in the detectors. The clamping circuit of amplitude limiter 10 is composed of resistances 27 and 29, a capacitance 25, and diodes 28 and 31. Capacitance 25 is the clamping capacitance. Diode 28 and resistance 29 set the reference voltage to which the input signal is clamped. Resistance 27 replaces the current drawn from capacitance 25 by the base of transistor 32 and provides for D.C. pull-up of the clamped input signal in the case of a reduction in input signal amplitude. Transistor 32 is an emitter follower which drives the clipping stage and serves to reduce the loading effects of the clipping stage on the clamping circuit. Diode 37 protects the base-emitter junction of transistor 32 from the effect of the input signal exceeding the emitter-base breakdown voltage of the transistor. The clipping circuit is composed of resistances 35 and 36, and diode 33. Resistances 35 and 36 set the clipping voltage, and diode 33 performs the clipping operation. The emitter follower transistor 32, drives the junction of resistances 35 and 36, and thereby the base of transistor 34, positive to within two diode drops of ground, those being the drops across diode 33 and the base-emitter diode junction of transistor 32. At this point the input signal, is clamped to ground and the junction of resistances 35 and 36 cannot be driven any farther positive. When the input signal goes negative, this junction is driven negative until the clipping diode 33 becomes back biased. At this point, the junction of resistances 35 and 36, and the base of transistor 34 cannot be driven any farther negative. The portions of the input signal which go farther negative from ground than this point are clipped and do not appear at amplitude limiter output means 12. Transistor 34 is an emitter follower driving the inputs of leading and trailing edge detectors 13 and 17, respectively. Resistance 38 serves as a D.C. load for transistor 34.

The clamped and clipped signal at output means 12 of amplitude limiter 10 (waveform B of FIG. 2) is coupled to leading edge detector 13 (FIG. 4) which detects the leading edges of the sync pulses in the clipped input video signal from amplitude limiter 10, and clamps the tips of these sync pulses to ground. The clamp circuit is forced to reclamp each sync pulse to ground. The clamping operation provides a ground referenced signal at output means 16 for the input to trailing edge detector 17. This is accomplished by using a transistor differential pair for a clamp circuit. During this clamping action, input transistor 43 is driven into saturation. The saturated collector output of transistor 43 is supplied to output gate 15 (waveform C of FIG. 2) to initiate the beginning of the reconstructed output sync pulse on output means 23 (waveform H of FIG. 2) whenever the leading edge of an input sync pulse is detected. The first portion of an input pulse which drives input transistor 43 into saturation is defined and used as the beginning of the input pulse. Capacitance 41 is the clamping capacitance. Resistance 44 replaces the charge drawn from capacitance 41 by the base currents of transistors 43 and 51. Resistance 44 also supplies sufficient excess current, above the base current requirements of transistors 43 and 51, to shift the charge on capacitance 41 by an amount sufficient to cause transistor 43 to saturate and reclamp the tip of each incoming sync pulse. Transistors 43 and 45 are the differential pair which perform the clamping operation. The base-emitter drop of transistor 45 compensates for the base-emitter drop of transistor 43 such that the trip point at which transistor 43 begins to conduct is within a differential pair offset from ground. When an input sync pulse occurs, the base of transistor 43 is driven above the trip point where it begins to conduct. The base is driven above ground because the previous sync pulse was clamped to within a differential pair offset from ground and current was driven into capacitance 41 from resistance 44 during the period between sync pulses. The current driven into capacitance 41 increases its charge. Therefore, when the input side of capacitance 41 is driven positive by the sync pulse, the base of transistor 43 is driven above the trip point by an amount equal to the increase in voltage across capacitance 41, and it begins to conduct. The collector load resistance 47 of transistor 43 is sufficiently larger than the differential pair emitter bias resistance 46, that transistor 43 will go into saturation when it begins to conduct. When transistor 43 goes into saturation, the forward current gain of the transistor goes to unity, and the impedance into the base of the transistor becomes that of resistance 46. The current driven into capacitance 41 by resistance 44 during the period between input sync pulses is then discharged through the base-emitter junction of transistor 43 and through resistance 46. The voltage at the base of transistor 43 will therefore drop until the differential pair trip point is reached. At this point the tip of the sync pulse has been clamped to within a differential pair offset of ground. The clamping period is always less than the width of the input pulse. The leading edge detector output at the collector of transistor 43 will remain at ground after the input pulse has been clamped to ground. This is because the excess current supplied by resistance 44 continues to drive the base of transistor 43 positive. This results in a continuous clamping action for the full pulse width of the input sync pulse. The base of transistor 43 will be pulled below the differential pair trip level at the conclusion of the input sync pulse, and transistor 43 will go into cutoff. During the period between sync pulses, the base of transistor 43 is held below the differential pair trip point by the input signal from amplitude limiter 10 and, therefore, transistor 43 is held in cutoff. The output at the collector of transistor 43 becomes a saturated transistor collector-emitter drop (that of transistor 43) to a base-emitter drop below ground (that of transistor 45) each time leading edge detector 13 detects the beginning of a sync pulse in the composite video input signal to the sync detector. The output remains in this state for the duration of the input sync pulse.

The trailing edge detector 17 (FIG. 5) detects the trailing edges of the sync pulses in the clipped video input signal from output means 16 of leading edge detector 13 (waveform D of FIG. 2). This is accomplished by clamping the tips of the sync pulses to ground, which is performed by leading edge detector 13, and then detecting whenever the input signal goes farther negative from ground than a preset reference level. The trailing edge detector output (waveform E of FIG. 2) is a positive going pulse occurring each time there is a sync pulse which drives the input of the detector above, and then below, a given reference level. The leading edge of the detector output pulse occurs when the detector input is driven above the reference level. The output pulse remains positive during the period in which the input is above the reference level, and the trailing edge of the output pulse occurs when the input is driven below the reference level. This operation occurs each time there is a sync pulse in the video input signal to the sync detector. The trailing edge of this output pulse is used to trigger dual mode half shot circuit 19. Transistors 51 and 52 are a differential pair which compare the clamped signal from the leading edge detector against a reference level. The reference level is set to be less negative from ground than the minimum amplitude of the sync pulse input, as measured from the tip of the input sync pulse to the black level of the input video signal. The reference level is supplied to the base of transistor 52 by the voltage divider comprised of resistances 55 and 57. Capacitance 56 is a noise filter for the reference level voltage. Resistance 54 is the collector load resistance of transistor 52 and resistance 53 is the emitter bias resistance of the differential pair. The circuit composed of resistances 61 and 59, diode 60, and transistor 58 is an output driver for the trailing edge detector. If the signal at the base of transistor 51 has driven that base below the reference level at the base of transistor 52, transistor 51 will be cut off and transistor 52 will be in saturation. If the signal at the base of transistor 51 then drives the base above the reference level, as when a sync pulse occurs, transistor 51 begins to conduct and transistor 52 goes into cutoff. When transistor 52 goes into cutoff, the collector voltage begins to rise toward the positive supply voltage. When the collector voltage of transistor 52 begins to rise, diode 60 becomes back biased and the base-emitter junction of transistor 58 becomes forward biased, driving transistor 58 into conduction. Transistor 58 then drives the output load of the trailing edge detector positive as the collector voltage of transistor 52 rises. Resistances 61 and 59 limit the current through transistor 58 during this stage of the operation of the trailing edge detector. When the base of transistor 51 has been driven above the reference level at the base of transistor 52, as during the period when a sync pulse is present in the composite video input signal into the sync detector, transistor 51 will be in conduction and transistor 52 will be cut off. With transistor 52 cut off, the emitter of transistor 58 will be approximately a base-emitter drop below the positive supply voltage level. At the termination of the sync pulse in the input video signal, the base of transistor 51 is driven below the reference level by the input signal. Transistor 51 then goes into cutoff, and transistor 52 goes into saturation. When transistor 52 goes into saturation, the voltage at the collector begins to drop from the cutoff voltage to the saturation condition voltage at approximately the reference level. At this time the base-emitter junction of transistor 58 becomes back biased by the diode drop of diode 60, cutting off transistor 58. Diode 60 then becomes forward biased and the output voltage of the trailing edge detector, at the emitter of transistor 58, is pulled down to the collector voltage of transistor 52.

The dual mode half shot circuit 19 (FIG. 6) supplies a signal to output gate 15 to terminate the reconstructed output pulse present at output means 23. The half shot circuit 19 is triggered by the trailing edge of the pulse on output means 18 from the trailing edge detector 17. The trailing edge of the pulse from trailing edge detector 17 occurs coincident with the trailing edge of the sync pulse detected in the composite video input signal. The output of the half shot circuit (waveform G of FIG. 2) is a positive pulse whose trailing edge is used as the signal to the output gate to terminate the reconstructed sync detector output pulse at output means 23. Therefore, the termination of the sync detector output pulse is delayed in time, after the termination of the input sync pulse, by the period of the half shot duty cycle. The dual mode half shot circuit 19 consists of the output transistor of a one shot and two resistance-capacitance time constant circuits. The two resistance-capacitance time constant circuits allow either of two half shot duty cycles to be chosen by means of diode gating. Transistor 52 of trailing edge detector 17 is used as the second transistor of the one-shot. Resistance 64 serves as a pull down resistance for driver transistor 58 and as an input resistance for half shot circuit 19. Resistance 66 and capacitance 62 form a first time constant circuit. Resistance 72 and capacitance 63 form a second longer time constant circuit. Diodes 67 and 73 prevent current drive into the time constant capacitances through diode 74 during the half shot duty cycle. Diode 74 provides protection against the base-emitter diode of transistor 68 becoming back biased by more than the emitter-base breakdown voltage when the half shot circuit is triggered. Diodes 71 and 65 are the gating diodes used to select the duty cycle of the half shot. Resistance 66 must charge the base side of capacitance 62 to a diode drop, diode 67, plus a base-emitter drop, that of transistor 68, above ground before resistance 66 can supply base current to transistor 68. If the cathode of diode 71 is grounded through a saturated transistor, the base side of capacitance 62 cannot be charged the required amount above ground to allow resistance 66 to supply base current to transistor 68. Therefore, the first time constant $\Delta t_1$ may be switched in or out of the dual mode half shot by, respectively, not grounding or grounding the cathode of diode 71. Resistances 66 and 72 are each capable of supplying sufficient base current to transistor 68 to saturate the transistor. Therefore, if diode 71 is not grounded, capacitance 62 will be recharged in one time constant ($\Delta t_1$) of the first time constant circuit after the half shot is triggered, and resistance 66 will supply base current to transistor 68. The duty cycle of the half shot is then equal to the first time constant $\Delta t_1$. If diode 71 is grounded, the first time constant circuit cannot supply base current to transisor 68. Therefore, he time constant circuit composed of resistance 72 and capacitance 63 will supply base current to transistor 68 after a period equal to the second, longer time constant $\Delta t_2$ after the half shot is triggered, and the duty cycle of the half shot will then be equal to the second, longer time constant $\Delta t_2$. The output of the sync detector, at the collector of transistor 77 (FIG. 7), is at ground during the condition of no sync pulse out. When either a horizontal or vertical reconstructed sync pulse is present at output means 23 of the sync detector, the voltage at the collector of transistor 77 is positive. Therefore, when there is a sync detector output pulse present, transistor 77 is cut off and, because of positive feedback in the output gate, transistor 75 of output gate 15 is in saturation. Conversely, when there is no reconstructed sync detector output pulse present, transistor 77 is in saturation and transistor 75 is cut off. If trailing edge detector 17 is triggered by noise in the composite video input signal, dual mode half shot circuit 19 will, in turn, be triggered. If this occurs during the period of no horizontal or vertical sync detector output pulse, the positive going leading edge of the half shot output pulse (waveform G of FIG. 2) which is coupled into the base of transistor 75 through capacitance 83, would drive transistor 75 into saturation. Transistor 77 would then be cut off by transistor 75, and a false output sync pulse would occur. This mode of operation is prevented by clamping the output of half shot circuit 19, at the collector of transistor 68, to ground through diode 82 and transistor 77 during the period in which there is no pulse present at sync detector output means 23. The primary purpose of dual mode half shot circuit 19, however, is to protect the sync detector from noise occurring within the period in which a sync pulse is present in the composite video input signal. Transistor 43 (FIG. 4) is in saturation when a sync pulse is present in the video input signal. Therefore, transistor 77 will be cut off and transistor 75 will be in saturation. A reconstructed sync pulse will then be present at sync detector output means 23. This output pulse may be terminated only by driving transistors 43 and 75 into cutoff, so that base current can be supplied to transistor 77 through resistance 44. If these conditions are met, transistor 77 will go into saturation and transistor 75 into cutoff. The reconstructed sync pulse at output means 23 will then be terminated. The leading edge of a horizontal or vertical sync pulse in the input video signal will drive transistor 43 into saturation and thereby drive output gate circuit 15 into the state in which transistor 77 is in cutoff and transistor 75 is in saturation. If, after this occurs, noise on the tip of the input sync pulse drives transistor 51 into cutoff but does not trigger the trailing edge detector, base current will be supplied to transistor 77 through resistance 44. Transistor 75, however, being in saturation, will hold transistor 77 in cutoff and the output of the sync detector will not change. Transistor 43 will be driven into cutoff and the trailing edge detector will generate an "end of sync pulse" signal, if a noise pulse on the tip of the input sync pulse should occur which is of sufficient amplitude to trigger the trailing edge detector. Base current would then be supplied to transistor 77 through resistance 44 and, if dual mode half shot circuit 19 were not used, transistor 75 would be driven into cutoff by the "end of sync pulse" signal from the trailing edge detector. Transistor 77 would be driven into saturation and transistor 75 would be driven into cutoff. The output pulse would then be terminated. At the end of the noise pulse, transistor 51 would be driven into saturation again and a new output sync pulse would be initiated. This operation would be repeated for each noise pulse. The dual mode half shot circuit prevents this mode of operation by delaying the "end of sync pulse" signal from the trailing edge detector by the duty cycle of the half shot circuit. The dual mode half shot circuit delays the end of sync signal by either a first period $\Delta t_1$ for all horizontal sync pulses or a second, longer period $\Delta t_2$ for all vertical sync pulses, depending on which time delay circuit is gated on. This permits the end of the noise pulse to occur and drive transistor 43 into saturation again before the output of the half shot circuit drives transistor 75 into cutoff. Therefore, the output of the sync detector does not change during the noise pulse because transistor 77 is always held in cutoff by either transistor 43 of leading edge detector 13 or transistor 75 of output gate 15. Thus, if the first time delay $\Delta t_1$ is chosen, the sync detector is protected against noise pulses less than that duration, which may occur during the input sync pulse. If the second, longer delay $\Delta t_2$ is chosen, the sync detector is protected against noise pulses less than the longer duration. The reconstructed sync detector output pulse, however, will be longer than the input pulse by either the first ($\Delta t_1$) or second ($\Delta t_2$) time period, depending upon which is selected by the signal applied to control terminal 21 of half shot circuit 19. This control signal (waveform F of FIG. 2) is provided by feedback from following sync separator circuitry and selects a first delay $\Delta t_1$ when a horizontal sync pulse is present, and a second longer delay $\Delta t_2$ when there is a vertical sync pulse present.

Output gate 15 generates the reconstructed output sync pulses at output means 23. This operation is controlled by leading edge detected 13, and trailing edge detector 17 operating through dual mode half shot circuit 19. The output of the leading edge detector initiates the reconstruction of an output sync pulse from output gate 15 when the beginning of a horizontal or vertical sync pulse is detected in the composite video input signal. When the end of the pulse occurs in the video input signal, the trailing edge of the input pulse is detected by trailing edge detector 17. The trailing edge detector, operating through the dual mode half shot circuit, then terminates the reconstructed output sync pulse (waveform H of FIG. 2). The bias network of transistor 77 is comprised of resistance 44, diode 76, resistance 78, and transistor 75. The base drive current of transistor 77 is supplied through resistance 44. Resistance 78 is a base pull down resistance used to insure cutoff of transistor 77. Diode 76 is used for D.C. bias to insure that transistor 77 will be cut off when either transistor 43 or transistor 75 is in saturation. Resistance 86 is the collector load resistance of transistor 77. Transistor 75 and its base bias circuit form a positive feedback circuit in the output gate. The base bias network of transistor 75 is comprised of resistance 84 and resistance 81, which is a pull down resistance for the base of transistor 75. Capacitance 85 is a speed-up capacitance. Diode 79 is a protection diode for the base-emitter junction of transistor 75. This diode prevents the input signal from the dual mode half shot circuit from driving the emitter-base junction of transistor 75 beyond its emitter-base breakdown voltage. Capacitance 83 is a coupling capacitance which couples the "termination of sync pulse" signal, from dual mode half shot circuit 19, into the output gate. Diode 82 is a gating diode which clamps the collector of transistor 68 of the dual mode half shot circuit to ground through output transistor 77 during the periods in which there is no pulse present at sync detector output means 23. The circuit composed of resistance 87 and capacitance 88 is a decoupling filter to attenuate spikes in the positive supply voltage caused by the switching of transistor 77. Transistor 43 will be cut off if a sync pulse is not present in the video input signal to the sync detector. Base current will then be supplied to the base of transistor 77 to place it in saturation, and transistor 75 will be cut off. The output 23 of the sync detector will be ground, which is the "no sync pulse out" condition. Transistor 43 will go into saturation when a sync pulse occurs in the video input signal, and will remain in saturation for the duration of the input pulse. When transistor 43 goes into saturation, the base current drive is removed from transistor 77 and it goes into cut off. When transistor 77 goes into cutoff, base current is supplied to transistor 75 through its base bias circuit. Transistor 75 then goes into saturation and, because transistor 75 is a part of the base bias network of transistor 77, locks transistor 77 in the cutoff state. Whenever transistor 77 is cut off there is a sync pulse present at output means 23 of the sync detector. When transistor 77 goes into cutoff, diode 82 becomes back biased and the dual mode half shot circuit is then released to send the "end of sync pulse" signal to the output gate. The base of transistor 43 will be driven below the differential pair trip point, and transistor 43 will be cut off when the input sync pulse ends. Base current will then be supplied to the base of transistor 77 through resistance 44. However, transistor 75, being in saturation, will continue to hold transistor 77 in cutoff. The trailing edge detector triggers the dual mode half shot when the trailing edge of the input pulse drives the base of transistor 51 below the differential pair trip point of the trailing edge detector. The dual mode half shot delays the trailing edge signal from the trailing edge detector for the chosen period, either $\Delta t_1$ or $\Delta t_2$, and then supplies an "end of sync pulse" signal to the base of transistor 75 through capacitance 83. The delayed trailing edge of the output pulse from the half shot then drives transistor 75 into cutoff. Base current is then supplied to transistor 77 through resistance 44 and transistor 77 is driven into saturation. When transistor 77 goes into saturation transistor 75 becomes cutoff. At this time, the sync detector output at the collector of transistor 77 appears as a saturated transistor to ground. This is the "no output sync pulse present" state of the sync detector. The output gate will remain in this state until the next sync pulse in the noisy composite video input signal causes the leading edge detector to trigger the output gate, bebinning the next reconstructed horizontal or vertical output sync pulse.

Thus it may be seen, in view of the foregoing explanation and figures of the drawing that the invention, a solid state video synchronizing pulse detection and reconstruction means, is a useful and necessary device.

While many modifications and changes may be made by replacing elements and components with equivalent structures, or by changing component values for particular applications, it is to be understood that we desire to be limited in the spirit of our invention only by the scope of the appended claims.

The invention described herein may be manufactured and used by or for the Government of the United States of America for governmental purposes without the payment of any royalties thereon or therefor.

We claim:

1. A solid state video synchronizing pulse detection and reconstruction means comprising:

amplitude limiting means having input means for receiving a noisy composite video signal including horizontal and vertical synchronizing pulses, said amplitude limiting means for clamping the tips of said synchronizing pulses to a reference level and clipping said composite video signal at a predetermined amplitude, and having output means for providing thereat said clipped composite video signal;

leading edge detection means coupled to said output means of said amplitude limiting means for receiving said clipped composite video signal, reclamping said video signal to a reference level, and detecting the leading edge of any synchronizing pulses therein, said leading edge detection means having a first output means for providing thereat said reclamped video signal and having a second output means for providing thereat a signal indicative of the detection of said leading edge of any synchronizing pulses in said video signal;

trailing edge detection means coupled to said first output means of said leading edge detection means for receiving said reclamped video signal and detecting the trailing edge of any synchronizing pulses therein, said trailing edge detection means having an output means for providing thereat a signal indicative of the detection of said trailing edge of any synchronizing pulses in said reclamped video signal;

dual mode half shot circuit means coupled to said output means of said trailing edge detection means for receiving said signal indicative of the detection of said trailing edge of any synchronizing pulses in said reclamped video signal and producing in response thereto after a selectable delay a pulse termination signal, said dual mode half shot circuit means having an input control terminal for receiving a control signal to determine said selectable delay, and having an output means for providing thereat said pulse termination signal; and output gate means coupled to said second output means of said leading edge detection means for receiving said signal indicative of the detection of said leading edge and producing the leading edge of a reconstructed video synchronizing pulse in response thereto, said output gate means also being coupled to said output means of said dual mode half shot circuit means for receiving said pulse termination signal and producing the trailing edge of said reconstructed video synchronizing pulse, and said output gate means having output means for providing thereat said reconstructed video synchronizing pulse.

2. A solid state video synchronizing pulse detection and reconstruction means as set forth in claim 1 wherein:

said dual mode half shot circuit means includes diode gating means coupled to said input control terminal for causing said dual mode half shot circuit means to delay the production of said pulse termination signal for a first predetermined period in response to said control signal at said input control terminal of a first potential level, and for a second predetermined period in response to said control signal at said input control terminal of a second potential level.

References Cited

UNITED STATES PATENTS

| | | | |
|---|---|---|---|
| 2,791,627 | 5/1957 | Thomas et al. | 178—7.3 |
| 3,383,463 | 5/1968 | Goodell et al. | 178—7.5 |
| 3,413,412 | 11/1968 | Townsend | 178—6 X |

JOHN S. HEYMAN, Primary Examiner

U.S. Cl. X.R.

178—7.5; 307—235, 237, 268, 273, 292; 328—164; 330—30